United States Patent Office 3,065,085
Patented Nov. 20, 1962

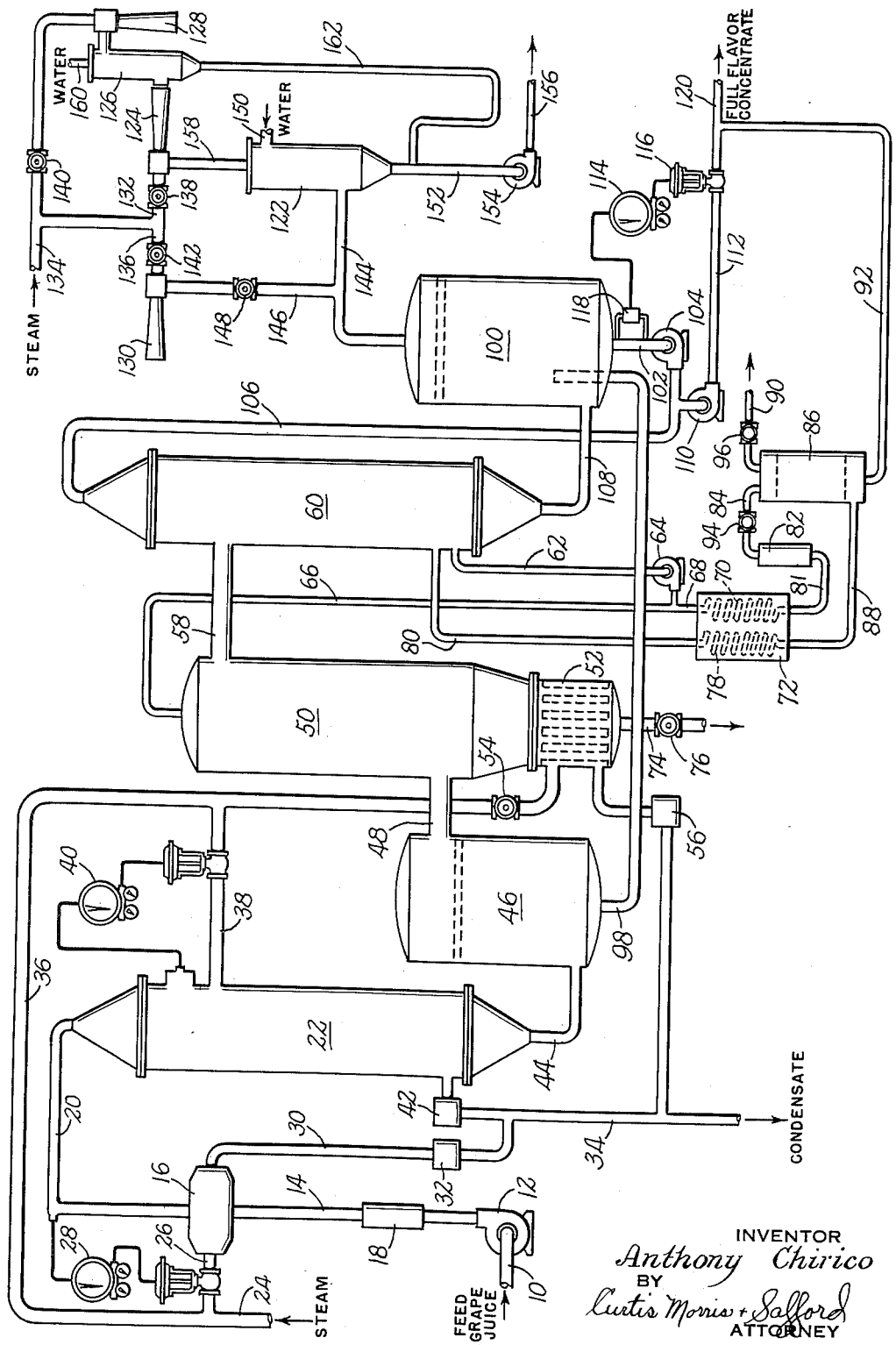

3,065,085
JUICE CONCENTRATION SYSTEM
Anthony N. Chirico, Roseland, N.J., assignor to Chicago Bridge & Iron Company, New York, N.Y.
Filed Aug. 27, 1959, Ser. No. 836,522
6 Claims. (Cl. 99—205)

This invention is concerned with concentration of fruit juices.

It is known that the flavor of fruit juices depends to an important extent upon the presence therein of small amounts of relatively volatile essential oils, sometimes called "essences." When an effort is made to concentrate a fruit juice, such as for example grape juice, by simple distillation, these essences are distilled off. Hence the re-constituted fruit juice made from such concentrate lacks the full flavor of the original juice.

It is further known that this difficulty can be avoided by distilling a first fraction of the raw juice from which the essence is recovered in concentrated form, then concentrating the remainder of the juice, and thereafter blending the concentrated juice and concentrated essence to produce a full flavor concentrate. Such a concentrate when reconstituted by addition of water thereto has a greatly improved flavor as compared with the re-constituted juices of prior concentrates. However, the cost of preparing such full flavor concentrates by the methods previously available has been relatively high.

It is accordingly an object of the present invention to provide an improved method of producing full flavor concentrates of fruit juices. It is another object of the invention to provide a method of producing such full flavor concentrates which results in a reduction in the size and amount of equipment required to produce a given amount of concentrate. It is still another object of the invention to provide a method of producing such concentrates which substantially reduces the steam required to yield a given amount of produce. Other objects of the invention will be in part obvious and in part pointed out hereafter.

The objects of the invention are achieved in general by providing a concentration system wherein the portion of the system for separating and recovering the essence and the portion of the system for concentrating the juice are more closely integrated than in prior systems of this type. More particularly in accordance with a preferred embodiment of the present process, the raw juice is heated to vaporize a first fraction containing the essence, the resulting first fraction vapor is rectified to concentrate essence therein, and the concentrated essence vapor is used as a heating medium for heating and further concentration of the remainder of the juice. In this way substantial economies in the overall process can be achieved.

In order to point out more fully the nature of the present invention, reference will now be made to the accompanying drawing which illustrates schematically a juice concentrating system capable of carrying out the method of the invention. Referring to the lefthand side of the drawing, the raw grape juice enters the system through a supply pipe 10 and is pumped by a pump 12 through pipe 14 to the shell side of a tube-in-shell pre-heater 16. Mounted in the pipe 14 there is a rotameter 18 for indicating the flow of grape juice through the pipe. From the pre-heater 16 the incoming juice flows through a pipe 20 to the tube side of a tube-in-shell stripping heater 22.

Steam to heat the juice in pre-heater 16 and stripping heater 22 enters the system through a supply pipe 24, also shown at the left side of the drawing. A portion of the incoming steam flows through branch pipe 26 to the tubes of pre-heater 16, the flow of steam being regulated by a temperature controller 28 responsive to the temperature of the juice within the pipe 20. Steam condensate formed in pre-heater 16 flows through pipe 30 to steam trap 32 and thence through pipe 34 to a suitable point of disposal, e.g., a boiler feed water tank.

The juice flowing through the tubes of stripping heater 22 is further heated by boiler steam. Thus a portion of the steam entering through supply pipe 24 passes through branch pipes 36 and 38 to the shell side of heater 22, the flow of steam being regulated by a pressure controller 40 which is made responsive to the pressure on the shell side of the heater. Steam condensate formed within heater 22 is conducted from a point near the bottom of the heater to a steam trap 42 and leaves the system through pipe 34.

In passing through the pre-heater 16 and stripping heater 22 the incoming juice is heated to a temperature above its boiling point and is partially vaporized in the tubes of heater 22. The resulting mixture of liquor and vapor flows through pipe 44 to a vapor body 46 wherein a further portion of the juice flashes into steam, and the vapors are separated from the concentrated liquor. As indicated in the introductory portion of the specification these vapors contain the essence that plays an important part in determining the flavor of the juice.

The vapors separated in vapor body 46 pass through a pipe 48 to a rectifying column 50, the bottom portion of which is provided with a tubular heating element 52. Steam is supplied to the heating element 52 from branch pipe 36 under the control of a regulating valve 54, and steam condensate formed within the heating element 52 passes to a steam trap 56 and thence to the condensate pipe 34 for removal from the system.

Vapors flowing up through the rectifying column 50 leave near the top of the column through a pipe 58 and flow to a combination condenser-heater 60 which is of the tube-in-shell type and wherein they are condensed. The resulting condensate is withdrawn from the condenser-heater 60 through a pipe 62 by a pump 64. The discharge of pump 64 is divided to cause a portion of the condensed vapors to be returned through pipe 66 to the top of column 50 as reflux, and to cause a second portion of the condensate to flow through pipe 68 to the cooling coil 70 of a cooler 72. The cooler 72 may be cooled in any suitable and well-known manner. The arrangement just described is such that the essence is concentrated in the rectifying column 50, and a portion of the concentrated essence is withdrawn as product through pipe 68 and cooler 72. The water separated from the juice fraction that flows to the rectifying column 50 is withdrawn at the bottom of the column through a pipe 74 provided with a regulating valve 76.

The cooler 72 has a second coil 78 connected by a pipe 80 to the interior of the shell side of condenser-heater 60 in such manner that non-condensable vapors accumulating within the condenser-heater can flow through pipe 80 and the coil 78 of the cooler 72. Thus cooler 72 serves to cool both the liquid essence fraction withdrawn from the rectifying column system through pipe 68 and also the non-condensable vapors accumulating in the condenser-heater.

The liquid stream from coil 70 is used to scrub the vapor stream from coil 78 to remove essence from the latter stream. More particularly the liquid essence fraction leaving cooling oil 70 flows through pipe 81, rotameter 82 and pipe 84 to the top of a scrubbing tower 86. Non-condensable vapors from cooling coil 78 flow through pipe 88 to the bottom of tower 86. Within the tower the liquid fraction flows downwardly in contact with the vapor fraction entering through pipe 88 and scrubs the vapors. The scrubbed vapors leave tower 86 through pipe 90 and the essence fraction leaves through pipe 92. Regulating valves 94 and 96 are provided in pipes 84 and 90 respectively.

Referring again to the vapor body 46, partially concentrated juice from this vapor body is further concentrated in apparatus now to be described. The partially concentrated juice flows from vapor body 46 through a pipe 98 to a vapor body 100, and is then pumped downwardly through the tubes of condenser-heater 60. More particularly, the partially concentrated juice is withdrawn from vapor body 100 through a pipe 102 and pumped by pump 104 through pipe 106 to the top of condenser-heater 60. Within the condenser-heater the juice is heated and partially vaporized by the hot vapors from column 50. The resulting liquid-vapor mixture leaves the bottom of condenser-heater 60 through a pipe 108 and flows back to the vapor body 100 wherein a portion of the heated juice flashes into vapor. Thus condenser-heater 60, vapor body 100 and pipes 106 and 108 comprise an evaporator for evaporating water from the partially concentrated juice.

A portion of the concentrated juice is withdrawn from pipe 106 by a pump 110 and discarged from the system through pipe 112. Removal of the concentrated juice is controlled by a controller 114 which comprises a regulating valve 116 in the pipe 112 and a liquid lever responsive device 118 connected to the pipe 102. The controller 114 operates in such manner as to regulate the withdrawal of concentrated juice to maintain a substantially constant liquid level in pipe 102. As shown in the drawing the concentrated juice from pipe 112 is mixed with the concentrated essence of pipe 92 to form a full flaxor concentrate that leaves the system through pipe 120.

The water vapor formed in vapor body 100 is condensed by a jet condensing system shown in the upper right and portion of the drawing. The jet condensing system comprises a first stage barometric condenser 122, a first stage steam jet 124, a second stage barometric condenser 126, a second stage steam jet 128 and a hogging jet 130. The jets 124, 128 and 130 are supplied with steam through pipes 132, 134 and 136 respectively which contain regulating valves 138, 140 and 142 respectively. Water vapor generated in vapor body 100 flows through pipe 144 to the first stage condenser 122. Interconnecting pipe 144 and hogging jet 130 there is a branch pipe 146 containing regulating valve 148. Hogging jet 130 is used for initial evacuation of vapor body 100 and the tube side of heater 60; during normal operation of the system valves 142 and 148 remain closed.

First stage condenser 122 is supplied through a pipe 150 with cooling water which condenses the vapors entering the condenser through pipe 144. The combined condensate and cooling water leaves condenser 122 through a pipe 152 and is pumped by pump 154 through pipe 156 to a suitable point of disposal. Non-condensable vapors are withdrawn from the top of condenser 122 through a pipe 158 by the jet 124 which discharges into the second stage condenser 126. Cooling water is supplied to condenser 126 through pipe 160 and the cooling water, together with any condensate that may be formed in the second stage condenser, flows from the bottom of the condenser through pipe 162 to pipe 152 where it is combined with the water leaving condenser 122. Evacuation of condenser 126 is effected by the steam jet 128 which exhausts to atmosphere. The arrangement is such that the vapor body 100 is maintained under a reduced pressure to produce flash evaporation of the partially concentrated juice therein.

In order to point out still further the nature of the present invention, there is given below a typical material balance for a juice concentrating system of the type described herein:

Feed grape juice at 68° F. and 15°
  Brix_____ 17,800 lbs./hr.
Water removed through pipe 74_____ 5,522 lbs./hr.
Water vapor to condensers through
  pipe 144_____ 6,300 lbs./hr.
Concentrated juice through pipe 112__ 5,800 lbs./hr.
Concentrated essence through pipe 92_ 178 lbs./hr.
Total full flavor concentrate_____ 5,978 lbs./hr.
Steam through pipe 24_____ 8,510 lbs./hr.
Steam through pipes 132—136_____ 100 to 200 lbs./hr.
Cooling water through pipe 150_____ 430 gals./min.
Cooling water through pipe 160_____ A few gals./min.
Temperature of vapor body 46_____ 213° F.
Pressure of vapor body 46_____ Atmospheric.
Temperature of vapor body 100_____ 125° F.
Pressure of vapor body 100_____ 26" vacuum.
Temperature of cooler 72_____ 35° F.

From the foregoing description it should be apparent that the present invention provides an unusually efficient method of producing a full flavor juice concentrate. By using the vapors from the rectifying column 50 as a source of heat for heating the partially concentrated juice in the condenser-heater 60, the quantity of steam required to achieve a given increase in the concentration of a given quantity of juice is substantially reduced. Hence the production of concentrated full flavor juice by the present method is more economical than with the methods previously available.

It is of course to be understood that the foregoing description is illustrative only, and that numerous changes can be made in the quantities of materials, operating conditions and specific steps described above without departing from the spirit of the invention as defined in the appended claims.

I claim:

1. In a method of concentrating fruit juice wherein (1) a first fraction of the raw juice is vaporized and a relatively small amount of essence separated therefrom by rectification (2) the remaining juice is heated to evaporate water therefrom and provide a concentrated juice and (3) the separated essence is blended with the concentrated juice to produce a full flavor concentrate, the improvement which comprises using the separated essence vapor produced in step 1 as the heating medium in step 2.

2. A method of concentrating fruit juice which comprises heating raw juice to vaporize a first fraction thereof and produce a partially concentrated juice, rectifying said first fraction to separate an essence therefrom, and bringing the separated essence in vapor form into heat exchange relation with said partially concentrated juice to evaporate water therefrom and produce a concentrated juice solution.

3. A method of concentrating fruit juice which comprises heating raw juice to vaporize a first fraction thereof and produce a partially concentrated juice, rectifying said first fraction to separate an essence therefrom, bringing the separated essence in vapor form into heat exchange relation with said partially concentrated juice to evaporate water therefrom and produce a concentrated juice solution, and blending said essence and said concentrated juice solution to produce a full flavor concentrate.

4. A method of concentrating fruit juice which comprises heating raw juice to vaporize a first fraction thereof, supplying said first fraction vapors to a rectifying column to separate therefrom an essence of said fruit juice, removing said essence in vapor form from the top of said fractionating column, and bringing the removed essence vapors into heat exchange relation with said partially concentrated juice to evaporate water therefrom to produce a concentrated juice solution.

5. A method of concentrating fruit juice which comprises heating raw juice to vaporize a first fraction thereof and produce a partially concentrated juice, introducing the first fraction vapors into a fractionating tower, removing the rectified portion of said first fraction vapors from the top of said fractionating tower, bringing the removed vapors into heat exchange relation with said partially concentrated juice to heat it and to condense said vapors, returning a portion of said condensate to said fractionating tower as reflux, recovering the remainder of said condensate as product essence, and subjecting the heated partially concentrated juice to a reduced pressure to evaporate water therefrom and produce a concentrated juice solution.

6. A method according to claim 5 and wherein said concentrated juice solution and said essence are blended to produce a full flavor concentrate.

References Cited in the file of this patent

UNITED STATES PATENTS

| | | |
|---|---|---|
| 2,450,774 | Zahm | Oct. 5, 1948 |
| 2,773,774 | McCarthy et al. | Dec. 11, 1956 |